United States Patent Office 3,334,112
Patented Aug. 1, 1967

3,334,112
AMINOALKYLENETHIOIMIDAZOLINE
DERIVATIVES
William Blythe Wright, Jr., Woodcliff Lake, N.J., and
Herbert Joseph Brabander, Pearl River, N.Y., assignors
to American Cyanamid Company, Stamford, Conn., a
corporation of Maine
No Drawing. Filed May 7, 1964, Ser. No. 365,780
6 Claims. (Cl. 260—309.6)

ABSTRACT OF THE DISCLOSURE

This invention relates to new products broadly described as 1-phenyl or substituted phenyl-2-amino or substituted amino alkylenethioimidazolines and acid addition salts. They are prepared by reaction of a 1-phenyl or substituted phenyl-2-thioimidazoline with an amino or substituted amino alkylene halide. The compounds are useful for their herbicidal activity.

---

The compounds of this invention may be defined as compounds of the formula:

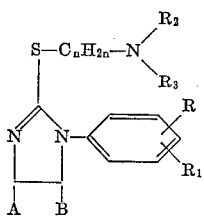

wherein, A and B are hydrogen or lower alkyl; R and $R_1$ are hydrogen, halogen, lower alkyl, lower alkoxy and trifluoromethyl; $R_2$ and $R_3$ are lower alkyl, lower alkenyl, cycloalkyl and aralkyl;

taken together is pyrrolidinyl, piperidino, hexamethyleneimino, morpholino and lower alkylpiperazinyl; $n$ is an integer from 2 to 4; and the acid addition salts of the above compounds.

The compounds of this invention may be either solids or liquids at room temperature and are relatively insoluble in water but soluble in most organic solvents, such as, for example, alcohols, ethers, esters, ketones, chloroform and the like. These compounds form acid addition salts such as, for example, the hydrochloride, phosphate, citrate, tartrate, maleate, fumarate, etc., which are generally soluble in water, ethanol and methanol and relatively insoluble in non-polar solvents such as lower alkyl ethers or hydrocarbons.

The compounds of this invention are preferably prepared by reacting a 1-aryl-2-imidazolidinethione with an aminoalkyl halide or tosylate. The reaction to prepare the present compounds may be illustrated as follows:

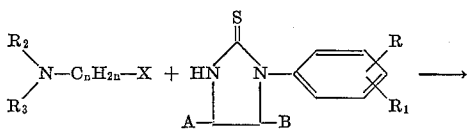

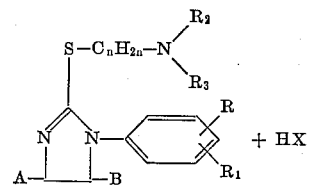

wherein R, $R_1$, $R_2$, $R_3$, A, B and $n$ are as hereinbefore defined and X is halogen or arylsulfonyloxy.

The reaction may be carried out in an inert solvent such as toluene, diglyme and the like at a temperature range of about 25° C. to about 150° C. and over a period of time ranging from about one-half hour to eight or more hours. The reaction takes place more readily in the presence of an alkaline condensing agent such as, for example, sodium, sodium hydride, potassium amide and the like.

Among the compounds considered within the scope of the present invention are the following:

1-(m-chlorophenyl)-2-[(3-dimethylaminopropyl)thio]-2-imidazoline;
1-(p-chlorophenyl)-2-[(3-dimethylaminopropyl)thio]-2-imidazoline;
1-(3,4-dichlorophenyl)-2-[(3-dimethylaminopropyl)thio]-2-imidazoline;
1-(3-chloro-4-tolyl)-2-[(3-dimethylaminopropyl)thio]-2-imidazoline;
1-(3-chloro-4-methoxyphenyl)-2-[(3-dimethylaminopropyl)thio]-2-imidazoline;
1-(m-trifluoromethylphenyl)-2-[(3-dimethylaminopropyl)thio]-2-imidazoline;
1-(m-chlorophenyl)-2-[(3-diallylaminopropyl)thio]-2-imidazoline;
1-(m-chlorophenyl)-2-[3-methylcyclohexylaminopropyl)thio]-2-imidazoline;
1-(m-chlorophenyl)-2-[(3-methylbenzylaminopropyl)thio]-2-imidazoline;
1-(m-chlorophenyl)-2-[(2-pyrrolidinylethyl)thio]-2-imidazoline;
1-(m-chlorophenyl)-2-[(2-piperidinoethyl)thio]-2-imidazoline;
1-(m-bromophenyl)-2-[(3-hexamethyleneiminopropyl)thio]-2-imidazoline;
1-(m-chlorophenyl)-2-[(3-morpholinopropyl)thio]-2-imidazoline;
1-(m-chlorophenyl)-2-[(3-methylpiperazinylpropyl)thio]-2-imidazoline, and the like.

The compounds of this invention have herbicidal activity. This activity may be demonstrated by the following evaluation procedure. The agar technique of herbicide evaluation consists of placing seeds of test plants on water agar (1.5%) into which a chemical has been incorporated (initial concentration, 500 p.p.m.) and over a three-week period observing effects on seed germination, root growth and shoot growth. The test species are:

(1) Monocots
    (a) Wheat (var. Genessee)
    (b) Sweet Corn (var. Golden Cross Bantam)
(2) Dicots
    (a) Radish (var. Early Scarlet Globe)
    (b) Cucumber (var. Marketer)

Ten ml. of each stock solution and/or suspension (100 mg. solid or 0.1 ml. of liquid chemical in 1 ml. of acetone to which is added 99 ml. of deionized water) is placed into each of four wide-mouth 2-oz. bottles with a 10 ml. syringe-pipette and then 10 ml. of 3.0% Difco-Bacto agar is placed into each bottle with a Filamatic Automatic Pipettor. The chemical-agar mixture gels and forms a medium uniformly impregnated with chemical at 500 p.p.m. Two seeds of corn and three each of wheat, radish and cucumber are placed on the surface, one species per bottle. Care is taken to place the corn seed embryos down, to facilitate germination. Seeds of each species placed on 1.5% water agar serve as the control series. Two ml. of water is added to each bottle to help provide optimum conditions for germination. The bottles are covered for 48 hours with glass plates to minimize the escape of volatile chemicals and with brown kraft paper to facilitate germination.

The seeds and plants are observed periodically following treatment and water is added as required. Results are noted after one week and chemicals that kill the seeds or plants of two or more test species are reevaluated at 100 and 10 p.p.m. using the same stock solution and the same procedures. Final data are recorded three weeks after initial exposure to the chemicals. All plant responses such as suppressed growth, elongated stems or leaves, leaf or root malformation and chlorosis as well as the more obvious symptoms of toxicity are recorded. Any chemical that kills two or more species or one that causes unusual responses is advanced to the initial postemergence and pre-emergence applied herbicide program. The herbicidal activity of representative examples of compounds of this invention is illustrated in Table I.

TABLE I.—PHYTOTOXICITY $S-(CH_2)_n-N(CH_3)_2 \cdot HCl$

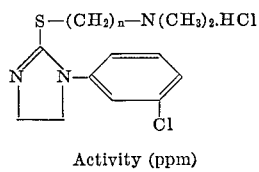

Activity (ppm)

| $n$ | Wheat | Radish | Cucumber | Corn |
|---|---|---|---|---|
| 2 | | 500 | 500 | 500 |
| 3 | 100 | 100 | 500 | 500 |

The compounds of this invention are formulated by admixture with a carrier material as conditioning agent, in the form of solutions, dusts, water dispersible powders, aqueous dispersions and emulsions, in order to utilize the herbicidal activity to best advantage. These formulations are suitable for efficient application to soil, weeds or unwanted plants using conventional applicator equipment.

The following examples describe in detail the preparation of representative compounds of the present invention.

EXAMPLE 1

*Preparation of 1-(m-chlorophenyl)-2-[(3-dimethylaminopropyl)-thio]-2-imidazoline hydrochloride*

A mixture of 50 parts of 1-(m-chlorophenyl)-2-imidazolidinone, 115 parts of phosphorous pentasulfide and 1000 parts of pyridine is heated at reflux temperature for 12 hours and concentrated to remove the solvent. The residue is poured into ice and water and the precipitate is filtered, washed with water and recrystallized from ethanol. The 1-(m-chlorophenyl)-2-imidazolidinethione melts at 172°–174° C.

A solution of 10.6 parts of 1-(m-chlorophenyl)-2-imidazolidinethione in 150 parts of diglyme, diethyleneglycol dimethyl ether, is added dropwise to a mixture of 2.9 parts of 50% sodium hydride (in mineral oil) in 100 parts of diglyme. After the evolution of hydrogen ceases, a solution of 7.8 parts of 3-dimethylaminopropyl chloride in 75 parts of diglyme is added. The reaction mixture is heated at reflux temperature for 4 hours, cooled and filtered. The mother liquor is concentrated to remove solvent and the residue is dissolved in ether. The ether layer is washed with water, dried over magnesium sulfate and concentrated to an oil. The oil is dissolved in ether and ethanolic hydrogen chloride is added. Crystals separate and are filtered off. This product is dissolved in 45 parts by volume of ethanol. The solution is cooled and some impurity is filtered off. The mother liquor is concentrated and the residue is dissolved in 15 parts of ethanol and 30 parts of ether are added. The crystals are filtered off and recrystallized from acetone. The 1-(m-chlorophenyl)-2-[(3-dimethylaminopropyl)thio]-2-imidazoline hydrochloride melts at 139°–141° C.

EXAMPLE 2

*Preparation of 1-(m-chlorophenyl)-2-[(2-pyrrolidinylethyl)thio]-2-imidazoline dihydrochloride*

When 2-pyrrolidinylethyl chloride is substituted for 3-dimethylaminopropyl chloride in the procedure of Example 1, 1-(m-chlorophenyl)-2-[(2-pyrrolidinylethyl)thio]-2-imidazoline is obtained. This compound is isolated as the dihydrochloride, melting point 189°–191° C.

EXAMPLE 3

*Preparation of 1-(m-chlorophenyl)-2-[(2-dimethylaminoethyl)-thio]-2-imidazoline dimaleate*

When 2-dimethylaminoethyl chloride is substituted for 3-dimethylaminopropyl chloride in the procedure of Example 1, 1-(m-chlorophenyl)-2-[(2-dimethylaminoethyl)thio]-2-imidazoline is obtained. This compound is characterized as the dimaleate, melting point 122°–123° C.

The procedure of Example 1 may also be used to prepare the following compounds:

| Example | Reagent A | Reagent B | Product (Base) |
|---|---|---|---|
| 4 | 1-(m-bromophenyl)-4-methyl-2-imidazolidinethione | 3-dimethylaminopropyl chloride | 1-(m-bromophenyl)-2-[(3-dimethylaminopropyl)thio]-4-methyl-2-imidazoline. |
| 5 | 1-(p-fluorophenyl)-5-methyl-2-imidazolidinethione | 3-(4-methylpiperazinyl)-propyl chloride | 1-(p-fluorophenyl)-2-[3-(4-methylpiperazinyl) propylthio]-5-methyl-2-imidazoline. |
| 6 | 1-(m-trifluoromethylphenyl)-2-imidazolidinethione | 4-piperidinobutyl chloride | 1-(m-trifluoromethylphenyl)-2-[(4-piperidinobutyl)thio]-2-imidazoline. |
| 7 | 1-phenyl-2-imidazolidinethione | 3-hexamethyleneiminopropyl chloride | 2-[3-(hexamethyleneiminopropyl) thio]-1-phenyl-2-imidazoline. |
| 8 | 1-(p-ethylphenyl)-2-imidazolidinethione | 3-morpholinopropyl chloride | 1-(p-ethylphenyl)-2-[(3-morpholinepropyl)thio]-2-imidazoline. |
| 9 | 1-(m-chlorophenyl)-2-imidazolidinethione | 3-cyclopropylmethylaminopropyl chloride | 1-(m-chlorophenyl)-2-[(3-cyclopropylmethylamino propyl)thio]-2-imidazoline. |
| 10 | do | 3-allylmethylaminopropyl chloride | 1-(m-chlorophenyl)-2-[(3-allylmethylaminopropyl)thio]-2-imidazoline. |
| 11 | 1-(m-chlorophenyl)-2-imidazolidinethione | 3-benzylmethylaminopropyl chloride | 2-[(3-benzylmethylaminopropyl)thio]-1-(m-chlorophenyl)-2-imidazoline. |

We claim:
1. a compound of the formula:

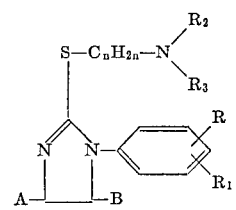

wherein, A and B are selected from the group consisting of hydrogen and lower alkyl; R and $R_1$ are selected from the group consisting of hydrogen, halogen, lower alkyl, lower alkoxy and trifluoromethyl; $R_2$ and $R_3$ are selected from the group consisting of lower alkyl, lower alkenyl, cycloalkyl of 3 to 6 carbon atoms and benzyl:

taken together is selected from the group consisting of pyrrolidinyl, piperidino, hexamethyleneimino, morpholine and lower alkylpiperazinyl; $n$ is an integer of from 2 to 4 or an acid addition salt thereof.

2. 1-(m-halophenyl) - 2 - [(3 - dimethylaminopropyl) thio]-2-imidazoline.

3. 1 - (m - chlorophenyl)-2-[(3 - diloweralkylaminopropyl)thio]-2-imidazoline.

4. The compound 1-(m-chlorophenyl)-2-[(3-dimethylaminopropyl)thio]-2-imidazoline.

5. The compound 1-(m-chlorophenyl)-2-[(2-pyrrolidinylethyl)thio]-2-imidazoline.

6. The compound 1-(m-chlorophenyl)-2-[(2-dimethylaminoethyl)thio]-2-imidazoline.

References Cited
UNITED STATES PATENTS

| | | | |
|---|---|---|---|
| 1,912,849 | 6/1933 | Kränzlein et al. | 260—309.6 |
| 2,813,102 | 11/1957 | Winthrop | 260—309.6 |
| 3,190,887 | 6/1965 | Hensley et al. | 260—309.6 |

WALTER A. MODANCE, *Primary Examiner.*

JOHN D. RANDOLPH, *Examiner.*

NATALIE TROUSOF, *Assistant Examiner.*